US010175729B2

(12) United States Patent
Kuramochi

(10) Patent No.: US 10,175,729 B2
(45) Date of Patent: Jan. 8, 2019

(54) OPENING/CLOSING DEVICE AND TERMINAL DEVICE USING THE SAME

(71) Applicant: KEM HONGKONG LIMITED, Kowloon (HK)

(72) Inventor: Ryuta Kuramochi, Kanagawa (JP)

(73) Assignee: KEM HONGKONG LIMITED, Kowloon (HK)

( * ) Notice: Subject to any disclaimer, the term of this patent is extended or adjusted under 35 U.S.C. 154(b) by 0 days.

(21) Appl. No.: 15/477,395

(22) Filed: Apr. 3, 2017

(65) Prior Publication Data

US 2017/0293324 A1 Oct. 12, 2017

(30) Foreign Application Priority Data

Apr. 11, 2016 (JP) .................................. 2016-078886

(51) Int. Cl.
*G06F 1/16* (2006.01)

(52) U.S. Cl.
CPC .......... *G06F 1/1681* (2013.01); *G06F 1/1616* (2013.01); *G06F 1/1679* (2013.01); *Y10T 16/547* (2015.01)

(58) Field of Classification Search
CPC ............... Y10T 16/547; Y10T 16/5387; Y10T 16/540255; Y10T 16/5478; Y10T 16/551; Y10T 16/540345; G06F 1/1681; G06F 1/1616; G06F 1/1679; G06F 1/1618; E05D 3/06; E05D 3/12; E05D 11/082; E05D 2011/085; E05D 2005/106; E05Y 2900/606; H04M 1/022; H05K 5/0226

USPC .......... 16/366, 371, 303, 330, 374, 340; 361/679.27, 679.06; 379/433.13; 455/575.3

See application file for complete search history.

(56) References Cited

U.S. PATENT DOCUMENTS

| 8,776,319 | B1* | 7/2014 | Chang | G06F 1/1681 16/303 |
| 9,021,659 | B2* | 5/2015 | Lin | E05D 11/06 16/303 |
| 9,290,976 | B1* | 3/2016 | Horng | G06F 1/1618 |
| 9,439,311 | B2* | 9/2016 | Hsu | E05D 3/122 |
| 2011/0265288 | A1* | 11/2011 | Chiang | G06F 1/1681 16/341 |
| 2013/0318746 | A1* | 12/2013 | Kuramochi | G06F 1/1681 16/342 |

FOREIGN PATENT DOCUMENTS

JP 2015-180833 A 10/2015

* cited by examiner

*Primary Examiner* — William L Miller
(74) *Attorney, Agent, or Firm* — Griffin and Szipl PC

(57) ABSTRACT

To provide an opening and closing device which can eliminate the torque fluctuations and ensure a secure unlocking, the opening and closing device based on biaxial hinge ensures that, when the second casing is opened from the close position to the initial opened position, and the stopper plate rotates relative to the first hinge shaft up to the initial opened position, the hinge shaft switcher switches from restraints to the rotation of the first hinge shaft to those to the rotation of the second hinge shaft, thus fixes the stopper plate at the initial opened position. The opening torque of the second casing is merely the sum of the torsion torque of the torsion spring and the friction torque of the first free stop tilting mechanism, and not subject to torque fluctuations. Therefore, the second casing can be securely opened.

10 Claims, 17 Drawing Sheets

OPENING/CLOSING DEVICE AND TERMINAL DEVICE USING THE SAME

This application claims priority from Japanese Patent Application No. 2016-078886, filed Apr. 11, 2016, the entire disclosure of which is incorporated herein by reference.

FIELD OF THE INVENTION

The present invention relates to an opening and closing device which couples a first casing provided with a keyboard (such as terminal main body) and a second casing provided with a display equipment such that both casings can open and close relative to each other in a terminal device such as notebook PC, electronic dictionary, PDA (Personal Data Assistant), etc.

BACKGROUND ART

In a notebook PC, a first casing provided with a keyboard portion is coupled in general via an opening and closing device to a second casing provided with a display equipment, etc., such that both casings can open and close relative to each other in a terminal device. In the above-mentioned opening and closing device, a lock holding means is provided for maintaining a locked state of the second casing in a closed state relative to the first casing.

The lock holding means of the opening and closing device converts a spring force of a disc spring urged in an axial direction of a second hinge shaft into a rotation torque around an axis of the second hinge shaft and urges the second casing in a closing direction.

Then, a opening torque for rotating the second casing in an opening direction is a sum of a spring torque converted in a cam mechanism and a friction torque of a free stop tilting mechanism. As spring torque converted in the cam mechanism, a large torque is generated, when a cam follower rides over a cam top of a cam portion.

For this reason, when the second casing is opened relative to the first casing in order to use the terminal device put on a desk, it requires a great force on one hand and the first casing is as well raised up on the other, which are problems in terms of use and operation of the terminal device. The known art which describes the above-described opening and closing device includes JP Laid-Open Patent Application No. 2015-180833 (FIG. 7, paragraph [0030]).

SUMMARY OF THE INVENTION

An object of the present invention is to provide an opening and closing device which enables a secure lock and a smooth opening and closing operation of the first casing and the second casing, and a terminal device using the opening and closing device.

A first aspect of the opening and closing device for achieving the object of the present invention relates to an opening and closing device which ensures that the second casing is smoothly opened relative to the first casing, from a closed position up to a predetermined opening angle.

The opening and closing device comprises: a first hinge shaft attached to the first casing; a second hinge shaft attached to the second casing; a coupling member for pivotally supporting the first hinge shaft and the second hinge shaft such that the both hinge shafts are freely rotatable relative to each other, wherein the former lies in a certain interval from the latter, and coupling the first hinge shaft and the second hinge shaft in parallel; a rotation restraining portion for restraining a rotation range of rotation of the coupling member and the first hinge shaft relative to each other between the closed position and an initial opened position; a hinge shaft switching mechanism for restraining a rotation of the second hinge shaft relative to the coupling member, up to the initial opened position of the coupling member as a result of its rotation relative to the coupling member, and for switching a rotating shaft in order to restrain a rotation of the first hinge shaft relative to the coupling member and to allowing for a rotation of the coupling member relative to the second hinge shaft, while a rotation position of the coupling member is the initial opened position; a closing spring for applying a spring force in a closing direction to the coupling member; and the second free stop tilting mechanism provided at least on the second hinge shaft for stopping by a friction torque the second casing attached to the second hinge shaft at any tilting angle.

A second aspect of an opening and closing device for achieving the object of the present invention is characterized in that, in above-mentioned first aspect, a hinge shaft switching mechanism comprises: a first locking cam fixed to the first hinge shaft, wherein a first locking concave groove is formed on an outer circumferential portion of the first locking cam; a second locking cam fixed to the second hinge shaft, wherein a second locking concave groove is formed on an outer circumferential portion of the second locking cam; and a locking piece for selectively moving between the first locking cam and the second locking cam, so that the locking piece engages with one of the first locking concave groove and the second locking concave groove, and disengages with other locking concave groove, wherein the first locking concave groove and the second locking concave groove sandwich the piece and face each other, while the coupling member rotates up to the initial opened position.

A third aspect of an opening and closing device for achieving the object of the present invention is characterized in that, in either one of the above-mentioned aspects, the closing spring is a torsion spring outwardly mounted on the first hinge shaft.

A forth aspect of an opening and closing device for achieving the object of the present invention is characterized in that, in either one of the above-mentioned aspects, the rotation restraining portion comprises: a first stopper projecting piece provided on the first hinge shaft and a stopper blocking portion provided on the coupling member so as to abut against the first stopper projecting piece.

An aspect of a terminal device for achieving the object of the present invention relates to a terminal device comprising the opening and closing device according to either one of the above-mentioned aspects.

The terminal device is characterized in that a first casing is attached to a first hinge shaft via a first bracket connected with the first hinge shaft, and a second casing is attached to a second hinge shaft via a second bracket connected with the second hinge shaft.

According to the first aspect of the invention, the opening torque for opening the second casing from the closed position to the initial opened position is a sum of the spring torque of the closing spring and, if necessary, of the friction torque of the free stop tilting mechanism. In this manner, no rapid torque fluctuation occurs according to the invention— while such rapid torque fluctuations do occur with a cam mechanism for converting a linear spring force into a rotational torque—, which ensures that the casing attached to the second hinge shaft can rotate up to the initial opened position.

According to the second aspect of the invention, a restraint of the first hinge shaft or second hinge shaft is smoothly and securely switched with their release from restraint, and vice versa.

According to the third aspect of the invention, a spring torque of a closing spring can be applied onto the coupling member, with a simple structure.

According to the forth aspect of the invention, the rotation restraining portion makes use of the coupling member, so it can be in a compact structure.

EMBODIMENT

In the following, the invention is explained, based on an embodiment shown in drawings.

Figure 1:
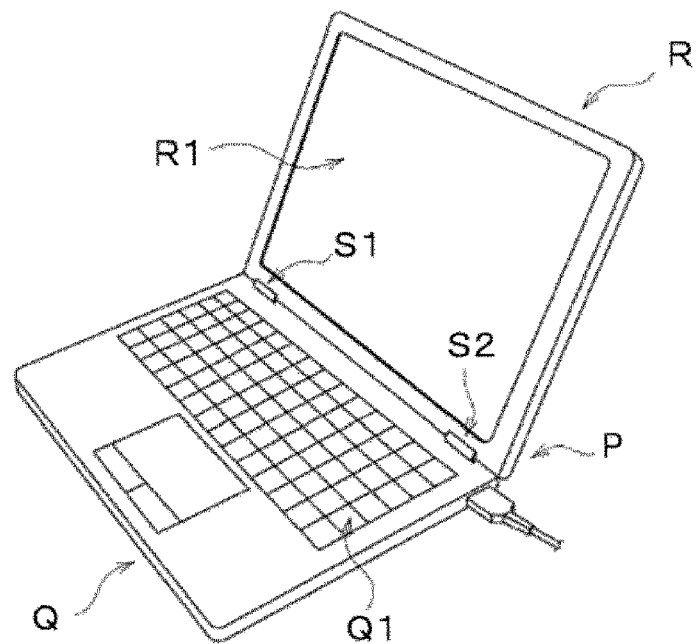
FIGS. 1A and 1B show an embodiment of a terminal device according to the invention, FIG. 1A being an elevation perspective view of its appearance illustrating a closed state of a second casing, and FIG. 1B—a back-side perspective view of its appearance illustrating the closed state of the second casing.
Figure 1:
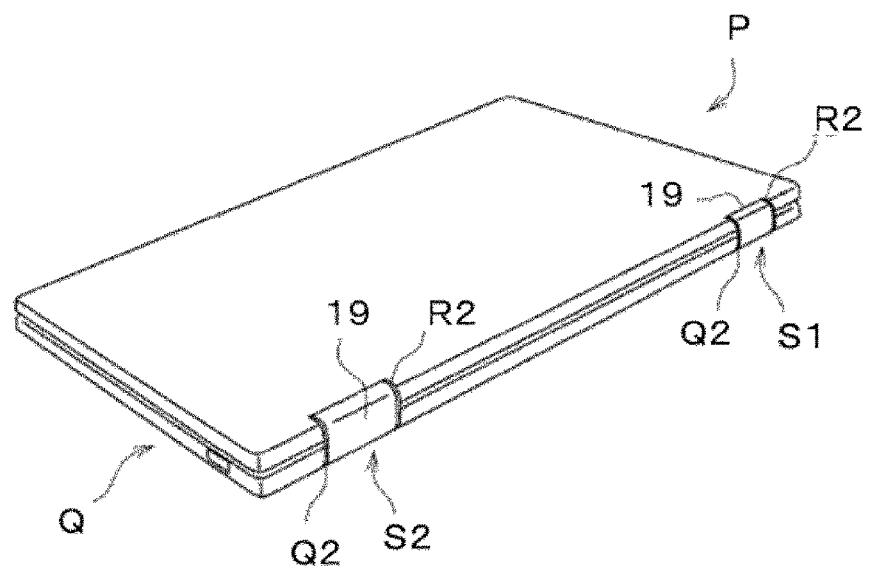
Figure 2:
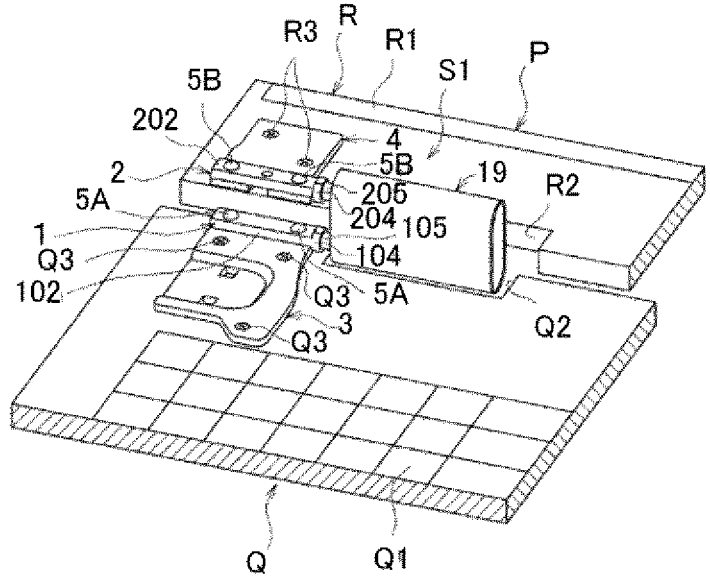
FIG. 2 shows an embodiment of an opening and closing device according to the invention as provided on a terminal device, being a perspective view of its appearance of a first casing and a second casing when the latter is opened 180 degrees relative to the former.
Figure 3:
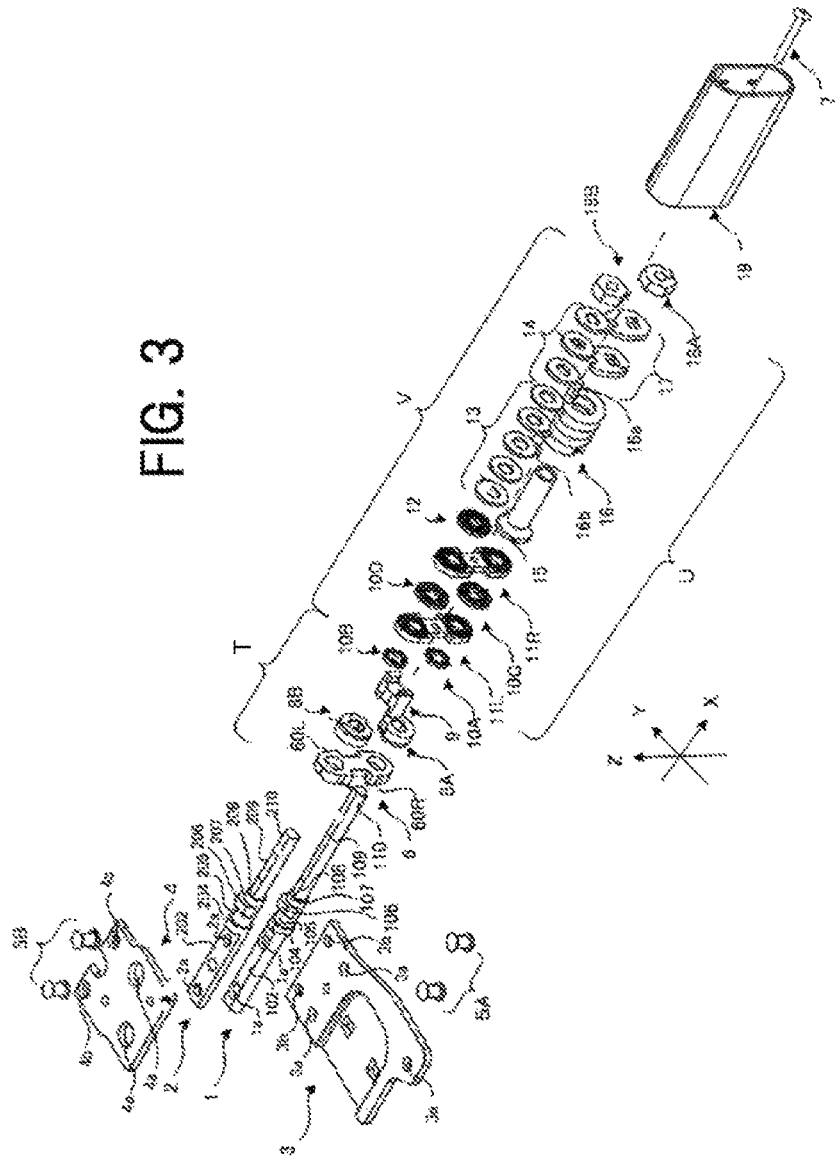
FIG. 3 is an exploded perspective view of an opening and closing device as shown in FIG. 2, showing however its closed state.

FIGS. 1A and 1B show an embodiment of a terminal device according to the invention, and FIG. 2 shows an embodiment of an opening and closing device (left hand side opening and closing device) according to the invention as provided on a terminal device FIG. 3 is an exploded perspective view of an opening and closing device as shown in FIG. 2.

[Structure of Terminal Device P]

In FIGS. 1A and 1B, 2 and 3, a notebook-type PC (in the following referred to as notebook PC in short) P being an example of terminal device comprises a first casing Q provided with a keyboard portion Q1 and a second casing R provided with a display portion R1. The first casing Q and the second casing R are coupled to each other by a left hand side opening and closing device S1 disposed on the left hand side on a rear portion of the notebook PC and a right hand side opening and closing device S2 disposed on the right hand side on the rear portion, such that both casings can open and close. Respective recess portions Q2 are formed on a rear portion of the first casing Q, in order to accommodate the left hand side opening and closing device S1 and the right hand side opening and closing device S2 respectively. Respective recess portions R2 are equally formed on a rear portion of the second casing R, in order to accommodate the left hand side opening and closing device S1 and the right hand side opening and closing device S2 respectively.

In the meantime, since a left hand side opening and closing device S1 and a right hand side opening and closing device S2 basically have the identical structure, reference will be made exclusively to the left hand side opening and closing device S1 as shown in FIGS. 2 and 3, and not to the right hand side opening and closing device S2.

[Overall Structure of Left Hand Side Opening and Closing Device S1]

As shown in FIG. 3, a left hand side opening and closing device S1 of the present embodiment comprises a first hinge shaft 1, a second hinge shaft 2, a first bracket 3, a second bracket 4, a hinge shaft switching mechanism T, a first free stop tilting mechanism U, a second free stop tilting mechanism V and a hinge case 19.

A left hand side opening and closing device S1 of the present embodiment is so-called biaxial hinge in which a first hinge shaft 1 and a second hinge shaft 2 are disposed in parallel. In the meantime, based on a position around an axis of the first hinge shaft 1 as shown in FIGS. 2 and 3, an axial direction of the first hinge shaft 1 is referred to as x axis, an axial direction perpendicular to x axis in horizontal direction as y axis, and an axial direction perpendicular to x axis and y axis as z axis. Moreover, in FIGS. 2 and 3, an axial center of the first hinge shaft 1 is denoted with X01, and that of the second hinge shaft 2 with X02, while an axis line of the first hinge shaft 1 is referred to as X1, and that of the second hinge shaft 2 as X2.

[Structure of First Bracket 3]

A first bracket 3 is formed in flat shape, and attached to a first casing Q by means of attaching screws Q3 passing through a plurality of first attaching holes 3a. On the other hand, the first bracket 3 is attached to a first hinge shaft 1 by means of flanged first attaching pins 5A passing through two second attaching holes 3b provided along an axial direction X1 on the first bracket 3, as well as through two attaching holes 1a provided on the first hinge shaft 1. The first bracket 3 is fixed to the first hinge shaft 1 by caulking inserted end portions of the first attaching pins 5A.

[Structure of Second Bracket 4]

A second bracket 4 is formed in flat shape, and attached to a second casing R by means of attaching screws R3 passing through a plurality of first attaching holes 4a. On the other hand, the second bracket 4 is attached to a second hinge shaft 2 by means of flanged second attaching pins 5B passing through two second attaching holes 4b provided along an axial direction X2 on the second bracket 4, as well as through two attaching holes 2a provided on the second hinge shaft 2. The second bracket 4 is fixed to the second hinge shaft 2 by caulking inserted end portions of the second attaching pins 5B.

[Structure of First Hinge Shaft 1]

As shown in FIG. 4, a first bracket attaching shaft portion 102 is formed on one end portion in axial direction (on the left hand side) beyond a first central shaft portion 101 of a first hinge shaft 1, while a first angular shaft portion 103 on the other end portion in axial direction (on the right hand side).

The first central shaft portion 101 comprises, from the first bracket attaching shaft portion 102 to the first angular shaft portion 103, a first stopper shaft portion 105 of diameter d0, a first flange portion 104 of diameter d1 (d1>d0), a first stopper projecting piece 106 integrally formed on an outer circumference of the first stopper shaft portion 105 to compose a rotation restraining portion projecting outward in a radial direction, and a first supporting shaft portion 107 of diameter d1.

A first stopper projecting piece 106 extends along a tangential direction to an outer circumference of a first stopper shaft portion 105, and comprises a right stopper abutting side 106a and a left stopper abutting side 106b facing each other, wherein each of them has a width d1 in a diameter direction, as well as an arc portion 106c intersecting the right and a left stopper abutting sides 106a, 106b facing each other, wherein the arc portion has a radius r1 (r1>d0/2) from a shaft center X01. Here, a direction along the right stopper abutting side 106a and the left stopper abutting side 106b of the first stopper projecting piece 106 (both stopper abutting sides are in parallel to each other) is referred to as z' axis direction, and a direction perpendicular both to X1 axis direction and to z' axis direction—as y' axis direction.

An upper surface 102a and a lower surface 102b are formed on respective flat surfaces of a first bracket attaching shaft portion 102, and both side surfaces 102c—on its arc surface. The flat surfaces for the upper surface 102a and the lower surface 102b are formed in parallel. In a first hinge shaft 1, a horizontal direction along the upper surface 102a and the lower surface 102b (both surfaces are in parallel) of the first bracket attaching shaft portion 102 is referred to as Y axis, while an upward and downward direction perpendicular to the upper surface 102a (or the lower surface 102b)—as Z axis.

Figure 4A:
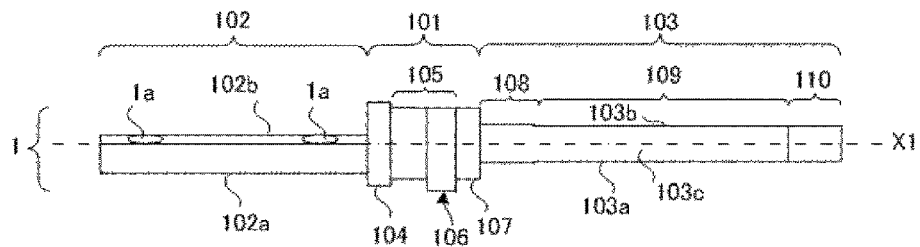
FIGS. 4A to 4F show a first hinge shaft as shown in FIG. 3, FIG. 4A being an elevation view, FIG. 4B—a top view, FIG. 4C—a sectional view in line A-A in FIG. 4B, FIG. 4D showing a state of the first hinge shaft having rotated α degrees counterclockwise from the state as shown in FIG. 4C, FIG. 4E being a sectional view in line B-B in FIG. 4B and further corresponding to FIG. 4C, and FIG. 4F—a sectional view in line B-B in FIG. 4B and further corresponding to FIG. 4D.
Figure 4B:
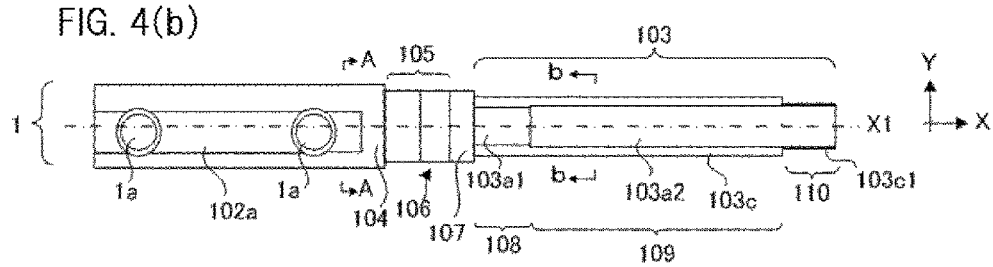
Figure 4C:
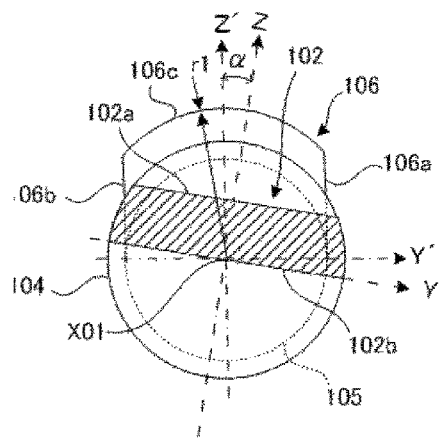
Figure 4D:
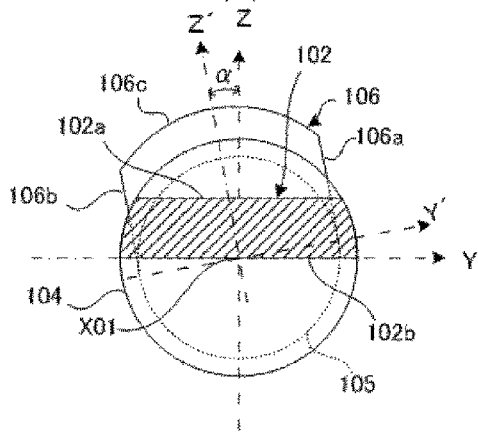

In the present embodiment, if, as shown in FIG. 4C, the Z' axis along an upward and downward direction of a first stopper projecting piece 106 is in parallel to a vertical direction, then a Z axis along an upward and downward direction of a first bracket attaching shaft portion 102 is shifted α degrees (e.g. 10 degrees) clockwise relative to the z axis. In other words, the first bracket attaching shaft portion 102 is formed with a shift of α degrees around the shaft center X01 relative to the first stopper projecting piece 106.

A first bracket 3 is attached to a lower surface 102b of a first bracket attaching shaft portion 102. Two attaching holes 1a are formed on the first bracket attaching shaft portion 102, wherein the attaching holes pass through the first bracket attaching shaft portion 102 in its depth direction. In other words, as shown in FIGS. 2 and 3, when a left hand side opening and closing device S1 is attached to notebook PC P, a first casing Q is in parallel to the lower surface 102b of the first bracket attaching shaft portion 102.

A first angular shaft portion 103 comprises an angular shaft for first locking cam 108 continuously provided with the first supporting shaft portion 107, an angular shaft for first free stop tilting mechanism 109 continuously provided with the angular shaft for first locking cam 108, a first screw shaft 110 continuously provided with the angular shaft for first free stop tilting mechanism 109.

Figure 4E:
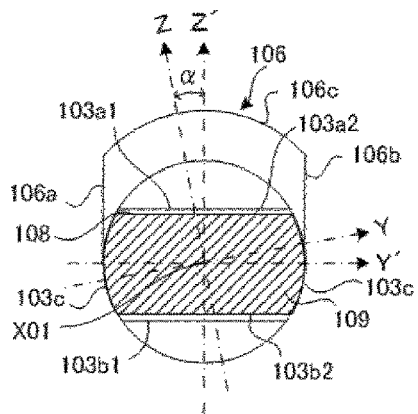
Figure 4F:
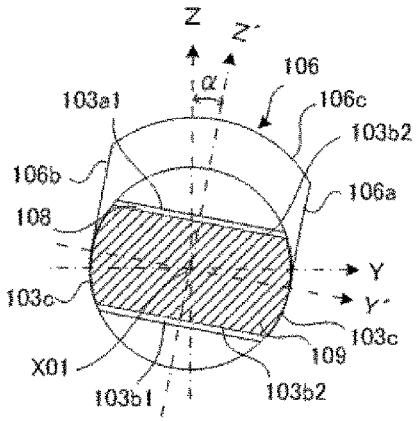

A first angular shaft portion 103 is composed of an upper surface 103a above a central axis X01 and a lower surface 103b below, wherein the both surfaces are flat and in parallel, as well as of both side surfaces 103c formed on an arc surface. The upper surface 103a and the lower surface 103b are formed in an identical distance from the central axis X01. As shown in FIGS. 4E and 4F, an axis line perpendicular to flat surfaces being the upper surface 103a and the lower surface 103b in an upward and downward direction corresponds to an upward and downward axis line z' of a first stopper projecting piece 106.

In an angular shaft for first locking cam 108, respective widths (lengths along a Y' axis direction) of an upper surface 103a1 and a lower surface 103b1 are narrower than that of an angular shaft for first free stop tilting mechanism 109. Therefore, in the angular shaft for first locking cam 108, the distance (height) between the upper surface 103a1 and the lower surface 103b1 are shaped to be slightly larger than the distance between an upper surface 103a2 and a lower surface 103b2 of the angular shaft for free stop tilting mechanism 109. The angular shaft for first free stop tilting mechanism 109 and a first screw shaft 110 have an equal height being a distance between the upper surface 103a2 and the lower surface 103b2. Male screws are formed on both side surfaces 103c1 of the first screw shaft 110, and as shown in FIG. 3, first nuts 18A are screwed onto the male screws.

[Structure of Second Hinge Shaft 2]

As shown in FIG. 5, a second bracket attaching shaft portion 202 is formed on one end portion in axial direction (on the left hand side) beyond a second central shaft portion 201 of a second hinge shaft 2, while a second angular shaft portion 203 on the other end portion in axial direction (on the right hand side).

A second central shaft portion 201 comprises, from the second bracket attaching shaft portion 202 to the second angular shaft portion 203, a second flange portion 204 of diameter d0, a second stopper shaft portion 205 of diameter d1 (d1>d0), a second stopper projecting piece 206 integrally formed on an outer circumference of the second stopper shaft portion 205 and projecting outward in a radial direction, and a second supporting shaft portion 207 of diameter d1.

A second stopper projecting piece 206 extends along a tangential direction to an outer circumference of a second stopper shaft portion 205, and comprises a right stopper abutting side 206a and a left stopper abutting side 206b facing each other, wherein each of them has a width d1 in a diameter direction, as well as an arc portion 206c intersecting the right and a left stopper abutting sides 206a, 206b facing each other, wherein the arc portion has a radius r1 (r1>d0/2) from a shaft center X02. Here, a direction along the right stopper abutting side 206a and the left stopper abutting side 206b of the second stopper projecting piece 206 (both stopper abutting sides are in parallel to each other) is referred to as z' axis direction, and a direction perpendicular both to X2 axis direction and to z' axis direction—as y' axis direction.

An upper surface 202a and a lower surface 202b are formed on respective flat surfaces of a second bracket attaching shaft portion 202, and both side surfaces 202c—on its arc surface. Flat surfaces for the upper surface 202a and the lower surface 202b are formed in parallel. In a second hinge shaft 2, a horizontal direction along the upper surface 202a and the lower surface 202b (both surfaces are in parallel) of the second bracket attaching shaft portion 202 is referred to as Y axis, while an upward and downward direction perpendicular to the upper surface 202a (or the lower surface 202b)—as Z axis.

Figure 5A:
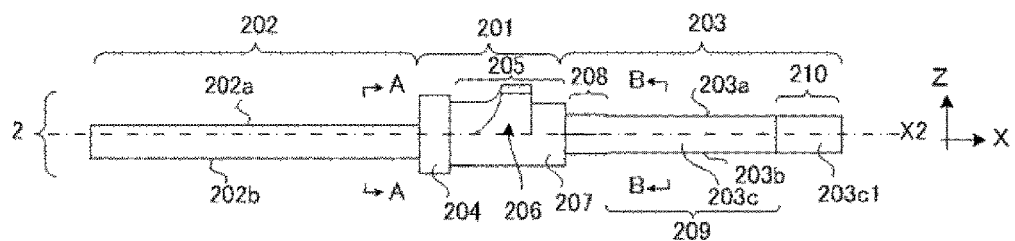
FIGS. 5A to 5D show a second hinge shaft as shown in FIG. 3, FIG. 5A being an elevation view, FIG. 5B—a top view, FIG. 5C—a sectional view in line A-A in FIG. 5A, and FIG. 5D—a sectional view in line B-B in FIG. 5A.
Figure 5B:
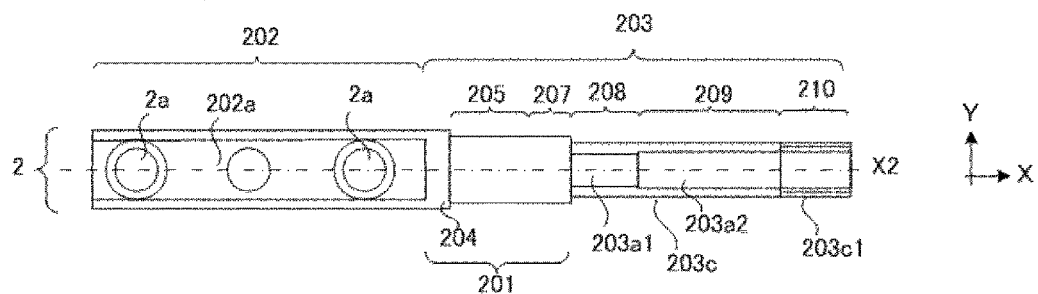
Figure 5C:
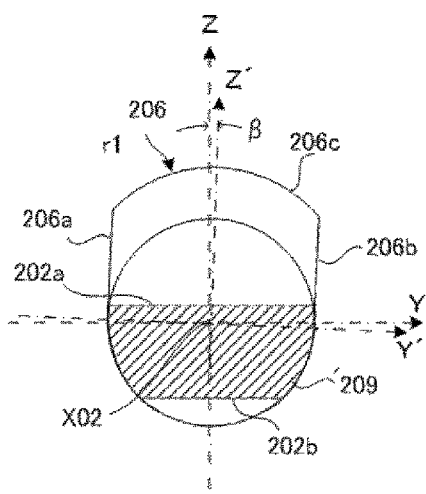

In the present embodiment, if, as shown in FIG. 5C, the Z' axis along an upward and downward direction of a second stopper projecting piece 206 is in parallel to a vertical direction, then the Z axis along with an upward and downward direction of the second bracket attaching shaft portion 202 is shifted β degrees (e.g. 4 degrees) clockwise relative to the z axis. In other words, the second bracket attaching shaft portion 202 is formed with a shift of β degrees around the shaft center X02 relative to the second stopper projecting piece 206.

A second bracket 3 is attached to an upper surface 202a of a second bracket attaching shaft portion 202. Two attaching holes 2a are formed on the second bracket attaching shaft portion 202, wherein the attaching holes pass through the second bracket attaching shaft portion 202 in its depth direction. In other words, as shown in FIGS. 2 and 3, when a left hand side opening and closing device S1 is attached to notebook PC P, a second casing R is in parallel to the upper surface 202b of the second bracket attaching shaft portion 202, as shown in FIG. 5C.

A second angular shaft portion 203 comprises an angular shaft for second locking cam 208 continuously provided with a second supporting shaft portion 207, an angular shaft for second free stop tilting mechanism 209 continuously provided with the angular shaft for second locking cam 208, a second screw shaft 210 continuously provided with the angular shaft for second stop tilting mechanism 209.

Figure 5D:
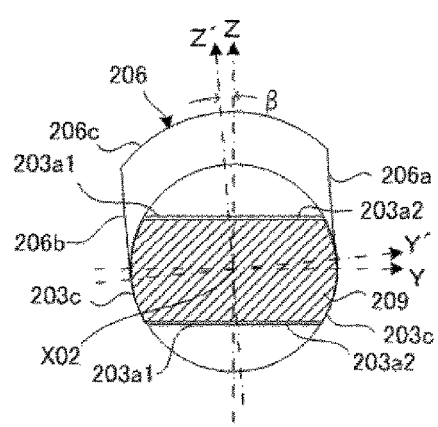

A second angular shaft portion 203 is composed of an upper surface 203a above a central axis X01 and a lower surface 203b below, wherein both surfaces are flat and in parallel, as well as of both side surfaces 203c formed on an arc surface. The upper surface 203a and the lower surface 203b of the second angular shaft portion 203 are formed in an identical distance from the central axis X02. As shown in FIG. 5D, an axis line perpendicular to flat surfaces being the upper surface 203a and the lower surface 203b in an upward and downward direction corresponds to an upward and downward axis line z' of the second stopper projecting piece 202.

In an angular shaft for second locking cam 208, respective widths (lengths along Y' axis direction) of an upper surface 203a1 and a lower surface 203b1 are slightly narrower than that of the angular shaft for second free stop tilting mechanism 209. Therefore, in an angular shaft for second locking cam 208, the distance (height) between the upper surface 203a1 and the lower surface 203b1 are slightly larger than the distance between an upper surface 203a2 and a lower surface 203b2 of the angular shaft for second free stop tilting mechanism 209. The angular shaft for second free stop tilting mechanism 209 and a second screw shaft 210 have an equal height being a distance between the upper surface 203a2 and the lower surface 203b2. Male screws are formed on both side surfaces 203c1 of the second screw shaft 210, and as shown in FIG. 3, second nuts 18B are screwed onto the male screws.

[Structure of Hinge Shaft Switching Mechanism T]

A hinge shaft switching mechanism T comprises a stopper plate 6 being a coupling member, a first locking cam 8A, a second locking cam 8B and a locking piece 9.

A stopper plate 6 comprises a plate main body 60 in vertically long elliptic shape, a first stopper blocking portion 61 being a rotation restraining portion, and a second stopper blocking portion 62 being a rotation restraining portion as well. The first stopper blocking portion 61 and the second stopper blocking portion 62 are formed on left side surface 60L of the plate main body 60. In the present embodiment, when a left hand side opening and closing device S1 is attached to a PC P, a left hand side surface of the plate main body 60 is referred to as left side surface 60L, and its right hand side surface—as right side surface 60R. Moreover, a first casing Q side is referred to as near side, and the opposite side—as rear side.

A first shaft hole 63 is formed on one end portion in the longitudinal direction of a plate main body 60, and a second shaft hole 64—on the other end portion. A guide portion 65 for guiding a locking piece 9 along the longitudinal direction is formed on a central portion in the longitudinal direction of the plate main body 60. The guide portion 65 comprises a guide post 66 provided on a central portion in longitudinal direction of the plate main body 60, guide concave portions 67, 68 provided right and left in short direction, and respectively made up of notches formed laterally symmetrically. In the meantime, the locking piece 9 to be described below is disposed on the right side surface 60R of the plate main body 60.

A first supporting shaft portion 107 of a first hinge shaft 1 is pivotally supported on the first shaft hole 63 so as to allow for a rotation with no backlash. A second supporting shaft portion 207 of the second hinge shaft 2 is pivotally supported on a second shaft hole 62 so as to allow for a rotation with no backlash. In other words, the first hinge shaft 1 is fixed to a first casing Q via a first bracket 3, so that a plate main body 60 of a stopper plate 6 can freely rotate around the axis center X01. Furthermore, a second casing R to which the second hinge shaft 2 is fixed via a second bracket 4 can freely rotate around a shaft center of the second shaft hole 62 of the stopper plate 60.

A first stopper blocking portion 61 abuts against a first stopper projecting piece 106 of a first hinge shaft 1, in order to restrain a rotation range of a stopper plate 6. A second stopper blocking portion 62 abuts against a second stopper projecting piece 206, in order to restrain the rotation range of a second hinge shaft 2. The first stopper blocking portion 61 and the second stopper blocking portion 62 are disposed on the near side of the plate main body 60, in vicinity of the first shaft hole 63 and the second shaft hole 64.

A first stopper blocking portion 61 is formed in a shape of arc substantially of 90 degrees around an axis center of the first shaft hole 63 (corresponding to the axis center X01 of the first hinge shaft 1). An inner circumferential surface of the first stopper blocking portion 61 is located outward of an inner circumferential edge of the first shaft hole 63. An end surface (one end surface) 61a on one end side (on a guide portion 65 side) and the other end surface 61b on the other end side of the first stopper blocking portion 61, as well as an end surface (one end surface) 62a on one end side (on a guide portion 65 side) and the other end surface 62b on the other end side of the second stopper blocking portion 62 are all inclined surfaces adjusted to an angle of 45 degrees relative to an axis line L1 along a longitudinal direction.

Figure 6A:
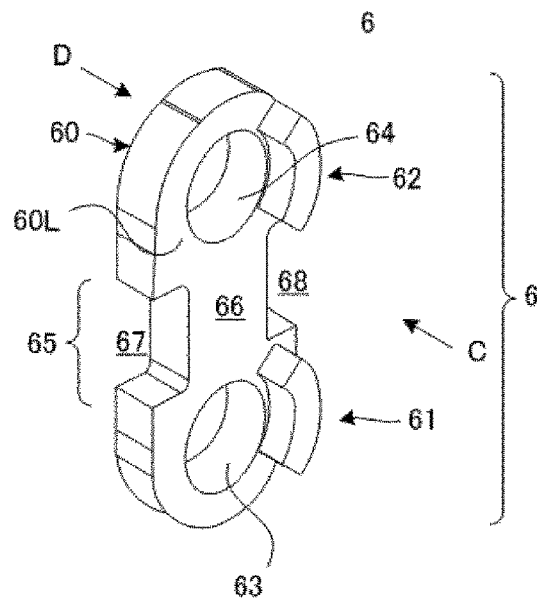
FIGS. 6A to 6C show a stopper plate as shown in FIG. 3, FIG. 6A being a perspective view, FIG. 6B—a view in line C in FIG. 6A, and FIG. 6C—a view in line D in FIG. 6A.
Figure 6B:
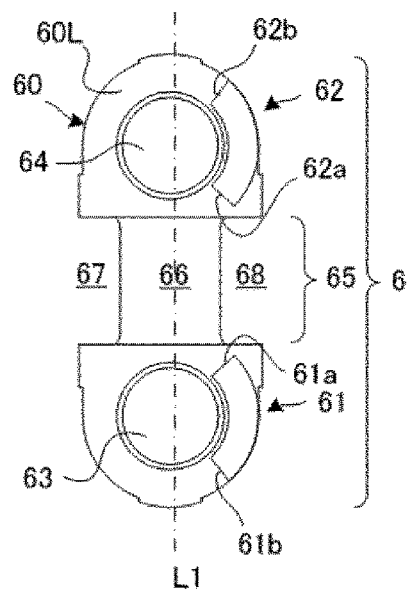
Figure 6C:
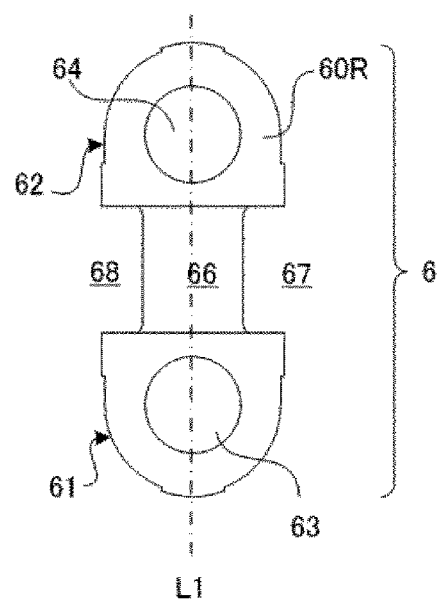

A first stopper blocking portion 61 and a second stopper blocking portion 62 have an identical shape, and are disposed symmetrically in an upward and downward direction, as shown in FIGS. 6A and 6B. This is to ensure that the same components are used both for a left hand side opening and closing device S1 and a right hand side opening and closing device S2.

As shown in FIG. 6B, a position in which a longitudinal axis line L1 of a stopper plate 6 lies perpendicular to a Y axis of the first hinge shaft 1 is a closed position of a second casing R. In a closed position of the second casing R, a z' axis of a first stopper projecting piece 106 of the first hinge shaft 1 is located with a shift of α degrees counterclockwise relative to the axis line L1. In this manner, when in FIG. 6B the stopper plate 6 rotates α degrees counterclockwise, a right stopper abutting side 106a of a first stopper projecting piece 106 abuts against one end surface 61a of the first stopper blocking portion 61, so that a counterclockwise rotation of the stopper plate 6 is restrained.

On the other hand, when a z axis of a second hinge shaft 2 corresponds to the axis line L1 of a stopper plate 6 as shown in FIG. 6B, a second stopper projecting piece 206 is inclined β degrees clockwise, so that a right stopper abutting side 206a abuts against the other end surface 62b of the second stopper blocking portion 62. In this state, the second casing R is held at a closed position.

Accordingly, a second hinge shaft 2 is rotatable until a left stopper abutting side 206b abuts against one end surface 62a of a second stopper blocking portion 62, i.e. within a range of 180 degrees relative to a second shaft hole 64 of a stopper plate 6. Still further, the stopper plate 6 is rotatable within a range of α degrees relative to the first hinge shaft 1.

Therefore, a second casing R is rotatable in an upward and downward direction with the maximum tilting angle of 180+α degrees. Here, if an angle of α degrees is defined as angle of 10 degrees, then the maximum tilting angle of the second casing R is 190 degrees.

[Structure of First Locking Cam 8A and Second Locking Cam 8B]

Figure 7A:
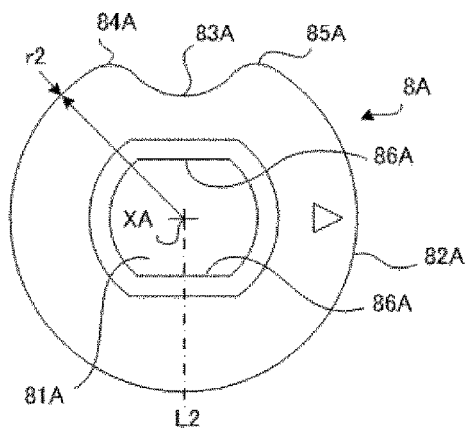
FIGS. 7A to 7C show locking cams as shown in FIG. 3, FIG. 7A being a view of a first locking cam as seen from the right hand side in FIG. 3, FIG. 7B—a view of a second locking cam as seen from the right hand side in FIG. 3, and FIG. 7C showing a phase relationship between the first locking cam attached to the first hinge shaft and the second locking cam attached to the second hinge shaft in a closed state.
Figure 7B:
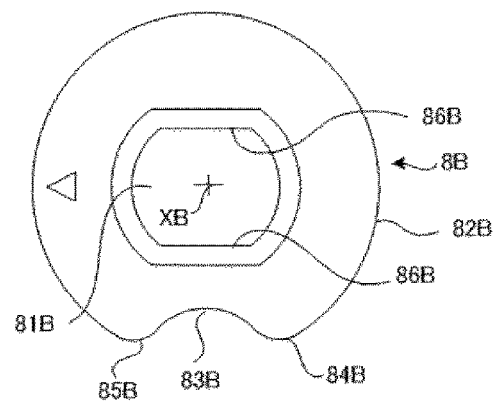

FIG. 7A shows a first locking cam 8A, while FIG. 7B—a second locking cam 8B. The first locking cam 8A and the second locking cam 8B have an identical structure, so reference is exclusively made to the former, and not to the latter. However, in case that components of the second locking cam 8B are the same as those of the first locking cam 8A, they use almost identical reference numerals as those of the latter, just here "first" in the component designation is replaced with "second", and "B" in the reference numeral's ending is used instead of "A".

A first locking cam 8A is formed in a disc shape, and a first angular hole 81A with a central point XA being its center is formed on the center of the first locking cam. The first angular hole 81A is formed in the same size as the cross section of an angular shaft for first locking cam 108 which is inserted into the first angular hole. Therefore, the first angular hole 81A engages with a first hinge shaft 1, such that the latter cannot rotate around the axis.

A first angular hole 81A comprises a first arc surface 82A having an outer circumferential edge as cam surface, a first locking concave groove 83A, a first left continuously provided surface 84A and a first right continuously provided surface 85A respectively continuously provided both sides in a circumferential direction of the first arc surface 82A and the first locking concave groove 83A with curved surfaces. A linear portion 86A of a first angular hole 81A is perpendicular to a central axis line L2 connecting a center of the first locking concave groove 83A with a central point XA. Therefore, a z' axis of a first hinge shaft 1 corresponds to the central axis line L2.

On the other hand, a second angular hole 81B engages with an angular shaft for second locking cam 208 of a second hinge shaft 2, such that the latter cannot rotate around the X02 axis. When a second casing R as attached to the second hinge shaft 2 is maintained in the closed position, the second locking concave groove 83B faces right below.

Figure 7C:
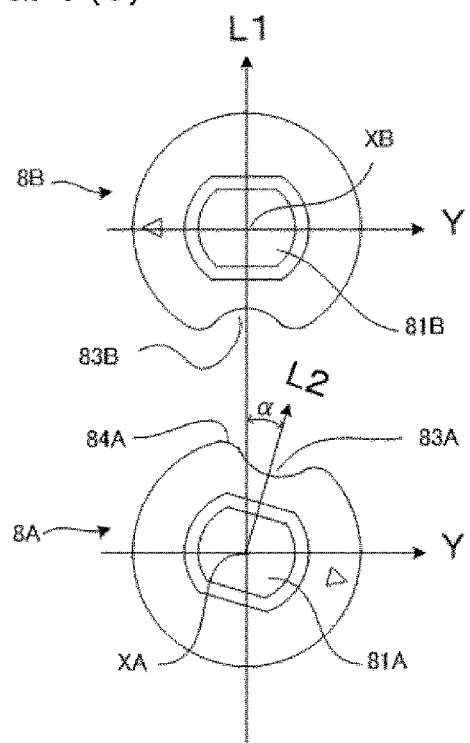

In this manner, if, as shown in FIG. 7C, one turns the line of sight from right to left along the axial direction of a first hinge shaft 1 to observe a first locking cam 8A and a second locking cam 8B, he will find that the first locking cam 8A is fixed to the first hinge shaft 1, wherein a first locking concave groove 83A faces upward and is inclined counterclockwise α degrees relative to an axis line L1 of a stopper plate 6. Furthermore, the second locking cam 8B is fixed to a second hinge shaft 2, with a second locking concave groove 83B facing right below.

[Structure of Locking Piece 9]

Figure 8:
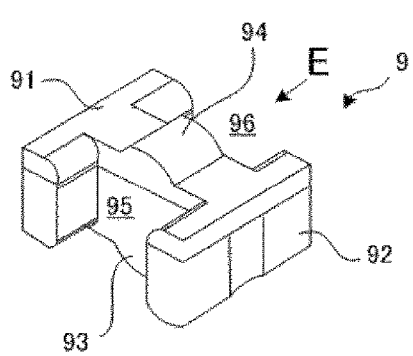
FIGS. 8A to 8D show a locking piece as shown in FIG. 3, FIG. 8A being a perspective view of appearance, FIG. 8B—a sectional view in line E in FIG. 8A, FIG. 8C—a top view of FIG. 8A, and FIG. 8D showing a position relationship with a first locking cam and a second locking cam.
Figure 8B:
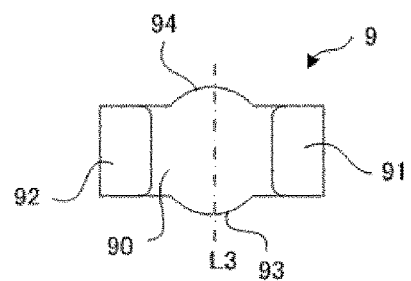
Figure 8C:
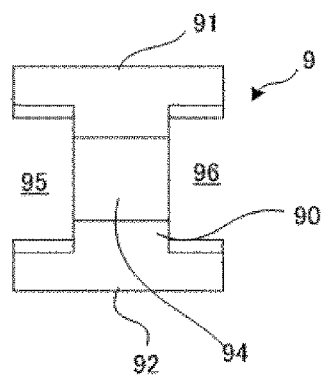

FIG. 8 shows a locking piece. FIG. 8A is a perspective view of appearance, FIG. 8B—a sectional view in line E-E in FIG. 8A, FIG. 8C—a top view of FIG. 8A, and FIG. 8D showing a position relationship with a first locking cam and a second locking cam.

A locking piece 9 comprises a first locking cam 8A and a second locking cam 8B, which are individually locked and released from a locking state. The locking piece 9 is formed in the shape of letter H in plan view as seen from a direction of an X1 axis. The locking piece 9 comprises a beam portion 90 on the center, girder portions 91, 92 provided on both ends of the beam portion, an arc-shaped first locking projection 93 formed to project downward on a lower surface side of the beam portion 90, and an arc-shaped second locking projection 94 formed to project upward on an upper surface side of the beam portion 90. The first locking projection 93 and the second locking projection 94 are symmetrically provided in an upward and downward direction, on an axis line L3 along an upward and downward direction on a central position.

Figure 8D:
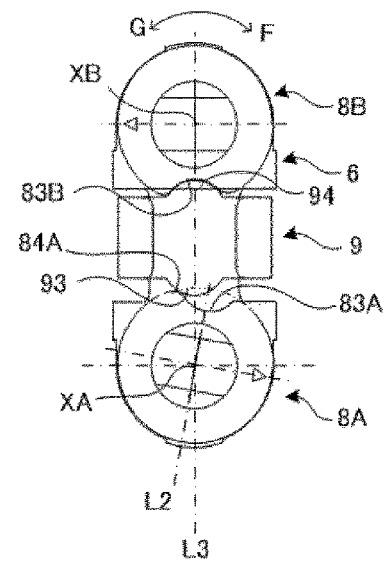

Furthermore, as shown in FIG. 8D, a first locking projection 93 and a second locking projection 94 can be fitted into a first locking concave groove 83A of a first locking cam 8A and a second locking concave groove 83B of a second locking cam 8B.

Both girder portions 91, 92 are formed on a locking piece 9, and a left inserting portion 95 and a right inserting portion 96 in a concave shape—left and right in an axial direction of a beam portion 90. A height along a direction of axis L3 of the both girder portions 91, 92 (hereinafter referred to as locking piece height) is lower than that of guide concave portions 67, 68 of a guide portion 65 of a stopper plate 6.

A left inserting portion 95 of a piece main body 90 is inserted into a guide portion 65 of a stopper plate 6, so as to be shiftable along a guide post 66 and non-rotatable around an X axis, while a right inserting portion 96 is inserted into a guide portion 11*e* of a left slide guide 11L and a right slide guide 11R to be described below, wherein both slide guides are integrally coupled.

When a second casing R is held in the closed position as shown in FIG. 8D, an axis line L1 in an upward and downward direction of a stopper plate 6 corresponds to an axis line L2 of a second locking cam 8B. In contrast, an axis line L2 of the first locking cam 8A is shifted α degrees.

In this manner, a second locking projection 94 of a locking piece 9 shiftable in an upward and downward direction along an axis line L1 of a stopper plate 6 is fitted into a second locking concave groove 83B of a second locking cam 8B, while a first locking projection 93 is not fitted into a first locking concave groove 83A of a first locking cam 8A, but abuts against a first left continuously provided surface 84A.

In this manner, a stopper plate 6 is now rotatable relative to a first hinge shaft 1, in an opening direction of a second casing R as denoted with an arrow F around an X1 axis. On the other hand, a second hinge shaft 2 is non-rotatable relative to a stopper plate 6, around the X2 axis. When the stopper plate 6 rotates in the opening direction F from the closed state shown in FIG. 8D, a locking piece 9 falls downward due to the gravity, so that a first locking projection 93 starts to get fitted into a first locking concave groove 83A of a first locking cam 8A. When the stopper plate 6 rotates α degrees until the rotation restrained position in which one end surface 61*a* of a first stopper blocking portion 61 of the stopper plate 6 abuts against a right stopper abutting side 106*a* of a first stopper projecting piece 106 of the first hinge shaft 1, a first locking projection 93 of a locking piece 9 is entirely fitted into the first locking concave groove 83A of the first locking cam 8A (this position is hereinafter referred to as stopper plate full-open position). In this case, the first locking projection 93 of the locking piece 9 just falls due to the gravity along an inner circumferential surface of the curved first locking concave groove 83A of the first locking cam 8A. In this manner, the above-mentioned movement does not cause a burden when the stopper plate 6 rotates toward the stopper plate full-open position, but secures a smooth rotation of the stopper plate 6.

In the present embodiment, when a second casing R starts to open from a closed position, a stopper plate 6 starts to rotate around an X1 axis toward a stopper plate full-open position, and a locking piece 9 starts to shift downward due to its own weight, so that a second locking projection 94 starts to gradually escape from a second locking concave groove 83B of a second locking cam 8B. In this manner, a second hinge shaft 2 starts to rotate relative to a second shaft hole 64 of the stopper plate 6, the second locking cam 8B abuts against the second locking projection 94 to push the locking piece 9 downwards. When a first locking projection 93 is entirely fitted into a first locking concave groove 83A, it is entirely released from the second locking concave groove 83B of the second locking cam 8B, and the second hinge shaft 2 is switched to be freely rotatable.

[Structure of First Free Stop Tilting Mechanism and Second Free Stop Mechanism]

As shown in FIG. 3, a first free stop tilting mechanism U comprises, from the left to the right in a direction of an X axis, a disc-shaped first left friction plate 10A, a left slide guide 11L, a disc-shaped central friction plate 10C, a right slide guide 11R, a spring guide cylinder 15, a torsion spring 16 being a closing spring (hereinafter also referred to as closing spring), two stoppers with spring retainer 17, and a first nut 18A. In the meantime, one side (the right hand side in the drawings) of each of the first left friction plate 10A, the left slide guide 11L, the disc-shaped central friction plate 10C and the right slide guide 11R is respectively processed to have waffle-knurl pattern, which is a well-elaborated solution to increase a friction torque.

A first left friction plate 10A, a left slide guide 11L, a disc-shaped central friction plate 10C, a right slide guide 11R, a spring guide cylinder 15, a torsion spring 16 and two stoppers with spring retainer 17 of a first free stop tilting mechanism U are all inserted into an angular shaft for first free stop tilting mechanism 109 of a first hinge shaft 1. In the meantime, an inner diameter portion of a torsion spring 16 is inserted into a spring guide cylinder 15.

A first nut 18A is screwed onto a first screw shaft 110 of a first hinge shaft 1; when a clamping torque, etc. of the first nut 18A is adjusted, a friction torque between a first left friction plate 10A, a left slide guide 11L, a disc-shaped central friction plate 10C and a right slide guide 11R is also adjusted, so that a predetermined friction force is secured for free stop of a first free stop tilting mechanism U. In FIG. 3, two stoppers with spring retainer 17 are provided, but the number of the stoppers is not limited to the one in this embodiment. Stoppers in any number appropriate for securing a predetermined friction force can be provided.

As shown in FIG. 3, a second free stop tilting mechanism V comprises, from the left to the right in a direction of an X axis, a disc-shaped second left friction plate 10B, a left slide guide 11L, a disc-shaped second central friction plate 10D, a right slide guide 11R, a disc-shaped right friction plate 12, six disc springs 13, two disc-shaped washers 14, and a second nut 18B. In the meantime, one side (the right hand side in the drawings) of each of the second left friction plate 10B, the left slide guide 11L, the disc-shaped second central friction plate 10D, the right slide guide 11R and the disc-shaped right friction plate 12 is respectively processed to have waffle-knurl pattern, which is a well-elaborated solution to increase a friction torque.

A second left friction plate 10B, a left slide guide 11L, a disc-shaped second central friction plate 10D, a right slide guide 11R, a disc-shaped right friction plate 12, a plurality of disc springs 13 and two washers 14 of a second free stop tilting mechanism V are all inserted into an angular shaft for second free stop tilting mechanism 209 of a second hinge shaft 2.

A second nut 18B is screwed onto a second screw shaft 210 of a second hinge shaft 2; when a clamping torque, etc. of a second nut 18B is adjusted, a friction torque between the second left friction plate 10B, a left slide guide 11L, a disc-shaped second central friction plate 10D, a right slide guide 11R and a disc-shaped right friction plate 12 is adjusted as well, so that a pressing pressure plus a spring force of disc springs 13 causes a predetermined friction force. In this manner, a second free stop tilting mechanism V can freely stop a second casing R within a predetermined tilting angle range, using a predetermined friction force for free stop of the second free stop tilting mechanism. In FIG. 3, two washers 14 are provided, but the number of the washers is not limited to the one in this embodiment. Washers in any number appropriate for securing a predetermined friction force can be provided.

A first left friction plate 10A and a second left friction plate 10B have an identical structure, so reference is exclusively made to the former, and not to the latter.

Figure 9A:
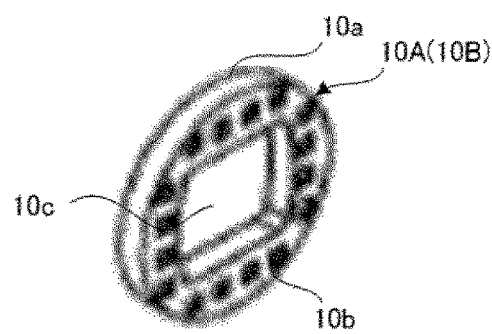
FIGS. 9A and 9B show friction plates as shown in FIG. 3, FIG. 9A being a perspective view of appearance of a left friction plate, and FIG. 9B—a perspective view of appearance of a central and a right friction plates.

As shown in FIG. 9A, the first left friction plate 10A formed in disc shape provides a friction contact surface by shaping a plurality of convex portions (blisters) 10b at predetermined intervals on one surface 10a on the right hand side in the same drawing. An angular shaft hole 10c into which an angular shaft for first free stop tilting mechanism 109 of a first hinge shaft 1 is fitted to be non-rotatable around an X1 axis is formed on a central portion of the first left friction plate 10A. In the meantime, an angular shaft for second free stop tilting mechanism 209 of a second hinge shaft 2 is fitted into an angular shaft hole 10c of the second left friction plate 10B to be non-rotatable around an X2 axis.

The first central friction plate 10C, the second central friction plate 10D and the right friction plate 12 have an identical structure, so reference is exclusively made to the last one, and not to the first two.

Figure 9B:
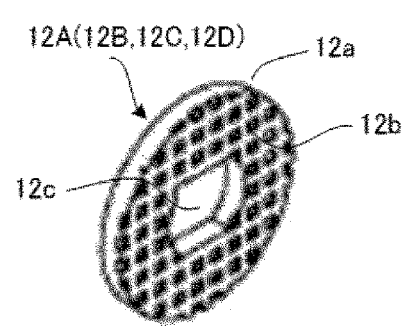

As shown in FIG. 9B, the right friction plate 12 formed in disc shape, in the same manner as the first left friction plate 10A, provides a friction contact surface by shaping a plurality of convex portions (blisters) 12b at predetermined intervals on one surface 12a on the right hand side in the same drawing. An angular shaft hole 12c into which the angular shaft for second free stop tilting mechanism 209 of the second hinge shaft 2 is fitted to be non-rotatable around the X2 axis is formed on a central portion of the right friction plate 12. In the meantime, an angular shaft for first free stop tilting mechanism 109 of a first hinge shaft 1 is fitted into an angular shaft hole 12c of the first central friction plate 10C to be non-rotatable around the X1 axis.

A left slide guide plate 11L and a right slide guide plate 11R have an identical structure, so reference is exclusively made to the former, and not to the latter.

Figure 10:
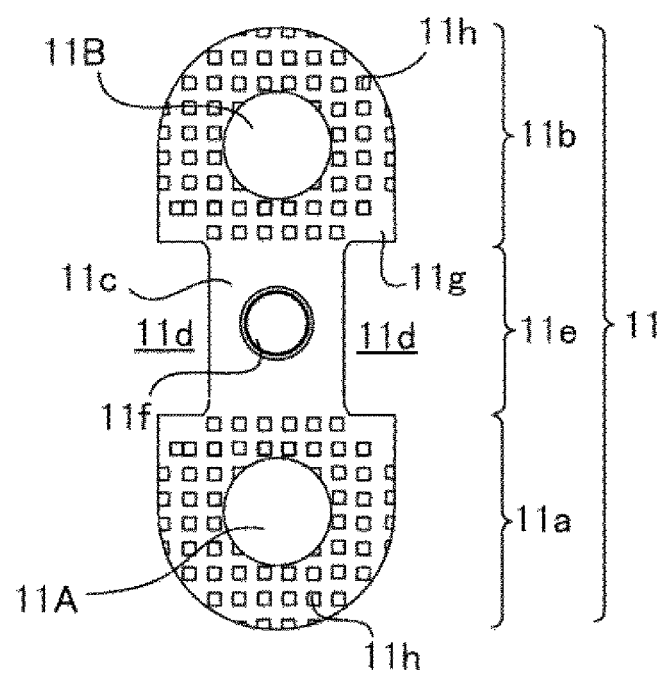
FIG. 10 shows a slide guide plate as shown in FIG. 3, its view from the right hand side.
Figure 11:
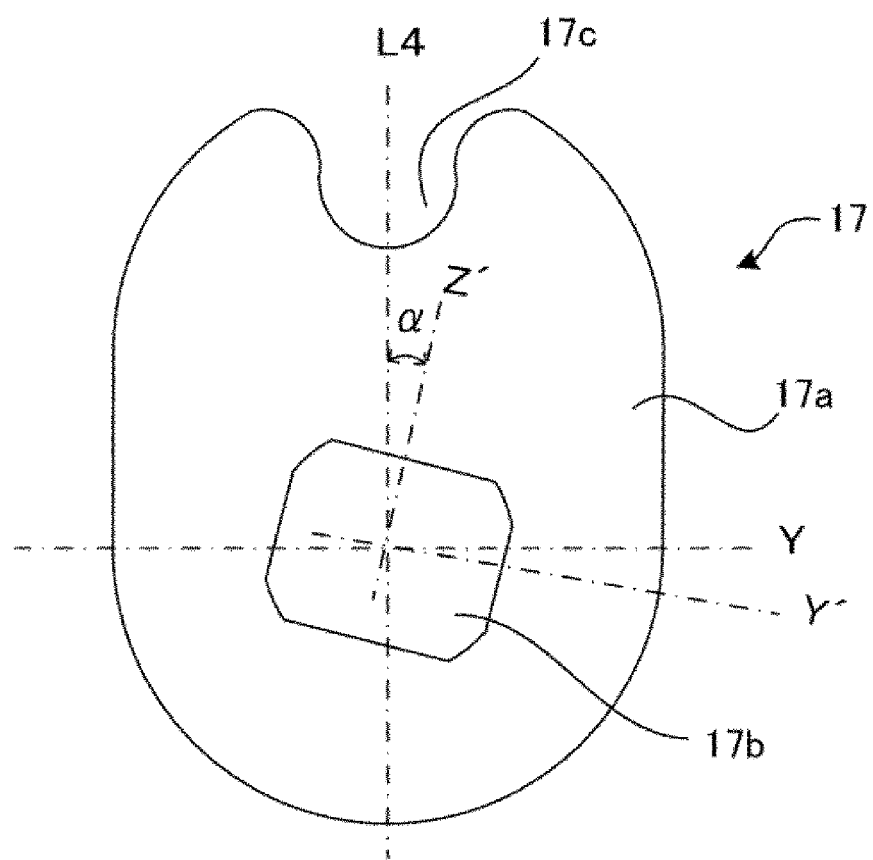
FIG. 11 shows in right hand side view a stopper with spring retainer as shown in FIG. 3.
Figure 12:
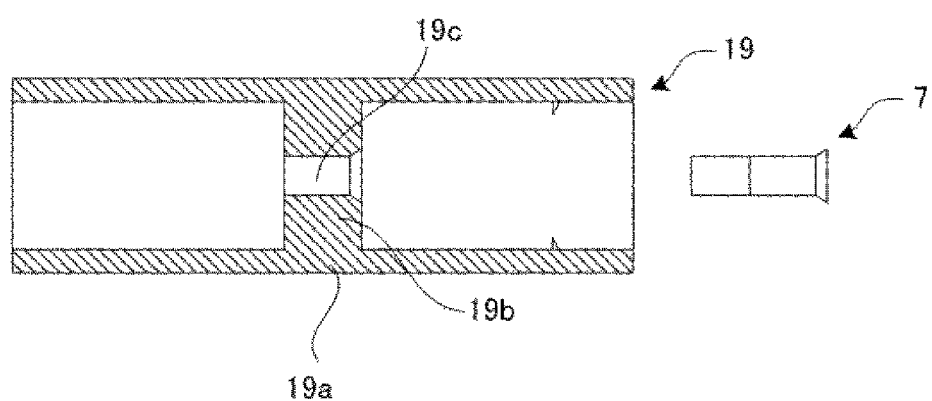
FIG. 12 shows in cross section a hinge case as shown in FIG. 3.

As shown in FIG. 10, a left slide guide plate 11L is formed with both a shape of appearance and an outer shape size being substantially being identical to a stopper plate 6. A plate main body 11 in vertically long elliptic shape comprises a first bearing portion 11a substantially in a semicircular shape, a second bearing portion 11b substantially in a semicircular shape and a guide post 11c for connecting the first bearing portion 11a and the second bearing portion 11b.

A circular first bearing hole 11A is formed on a first bearing portion 11a. The first bearing hole 11A is formed to have an inner diameter equal to a diameter of an angular shaft for first free stop tilting mechanism 109 (that of both arc-shaped side surfaces 103c) of a first hinge shaft 1, such that a left slide guide plate 11L can rotate around an X1 axis without backlash.

A circular second bearing hole 11B is formed on a second bearing portion 11b. The second bearing hole 11B is formed to have an inner diameter, such that a right slide guide plate 11R can rotate without backlash.

A center distance between a first bearing hole 11A and a second bearing hole 11B is set to be equal to that between a first shaft hole 63 and a second shaft hole 64 of a stopper plate 6. Accordingly, a first hinge shaft 1 and a second hinge shaft 2 are held by the left slide guide plate 11L and the right slide guide plate 11R to be in parallel to each other.

A guide portion 11e is formed on the left slide guide plate 11L, wherein the guide portion comprises guide concave portions 11d made up of notches formed laterally symmetrically on both sides of the guide post 11c, and a right inserting portion 96 of a locking piece 9 is slidably fitted into the guide portion. Screw holes 11f for securing a hinge case 19 by screws 7 is formed on the guide post 11c.

As shown in FIG. 10, each of a first bearing portion 11a and a second bearing portion 11b provides a friction contact surface by shaping a plurality of convex portions (blisters) 11h at predetermined intervals on one surface 11g on the right hand side in the same drawing.

A first left friction plate 10A and a first central friction plate 10C of a first free stop tilting mechanism U are brought into friction contact with a left slide guide plate 11L and a right slide guide plate 11R, such that a stopper plate 6 can be held at any tilting angle within the rotation range.

A torsion spring 16 of a first free stop tilting mechanism U is composed of a spring wire wound around clockwise, as shown in FIG. 3. Accordingly, the torsion spring 16 is first disposed in a position as shown in FIG. 3, and a tip 16a of the torsion spring 16 on the right hand end side in FIG. 3 is fixed to the first hinge shaft 1 via stoppers with spring retainer 17. Furthermore, a rear tip 16b of the torsion spring 16 on the left hand end side in FIG. 3 engages with respective end surfaces on the right hand side (as shown in FIG. 3) of a left slide guide plate 11L and a right slide guide plate 11R. The rear tip 16b of the torsion spring 16 engages with the left slide guide plate 11L and the right slide guide plate 11R above the X1 axis, at a position for preventing an interference with a slide movement of a locking piece 9.

A flange portion 15a against which a rear tip 16b side of a torsion spring 16 abuts is formed on a spring guide cylinder 15, in order to prevent a contact of the rear tip 16b of the torsion spring 16 with a right slide guide plate 11R.

Each stopper with spring retainer 17 comprises an angular shaft hole 17b formed on a central portion of a main body 17a in long elliptic shape, and a spring end engaging groove 17c made up of notch formed on a long circular portion. An angular shaft for first free stop tilting mechanism 109 of a first hinge shaft 1 is inserted into the angular shaft hole 17b, such that each stopper with spring retainer 17 is non-rotatable around the X1 axis. One end 16a of a torsion spring 16 engages with the spring end engaging groove 17c, which stops a rotation of the spring. In the present embodiment, in order to make a Z axis of a first hinge shaft 1 coincide with an axis line L4 passing the center of spring end engaging grooves 17c, the direction of the angular shaft holes 17b is shifted α degrees relative to the Z axis.

When a stopper plate 6 rotates toward an opened position, a left slide guide plate 11L and a right slide guide plate 11R as well rotate integrally with a stopper plate 6 via a second hinge shaft 2 in the identical direction. Here, the left slide guide plate 11L and the right slide guide plate 11R rotate with torsionally deforming the torsion spring 16. A spring force of the torsion spring 16 acts as holding force for holding the second casing R at the closed position.

Then, a second casing R held at the closed position starts to rotate in an opening direction, and a stopper plate 6 accumulates elastic restoring force, with directly torsionally deforming the torsion spring 16.

A fixing beam 19b of a hinge case 19 is formed in the interior of a main body 19a formed in hollow shape, such that the fixing beam crosses a space between the first hinge shaft 1 and the second hinge shaft 2. A through hole 19c through which an attaching screw 7 passes is formed on the fixing beam 19b. The attaching screw 7 passes through the through hole 19c and then is screwed into a screw hole 11f of a right slide guide plate 11R, so that a hinge shaft switching mechanism T, a first free stop tilting mechanism U and a second free stop tilting mechanism V are all housed in the hinge case 19, and thus attached to it without escaping. A right hand side surface of the hinge case 19 in FIG. 3 is covered with a cap not shown in the drawings.

Hereinafter, reference is made to the operation of the left hand side opening and closing device S1 according to the present embodiment, with reference to FIGS. 13 to 17.

FIG. 13 shows the state of the opening and closing device as shown in FIG. 3 at 0 degree. The first bracket 3 and the second bracket 4 overlap each other in an upward and downward direction, in parallel to each other. In case of the present embodiment, the first hinge shaft 1 fixed via the first bracket 3 to the first casing Q does not rotate, but is securely fixed. The second casing R overlaps the first casing Q and abuts against the latter. The second casing R is thus locked to the latter by elastic restoring force of the torsion spring 16. In the meantime, as shown in FIG. 13E, the second stopper projecting piece 206 abuts against the second stopper blocking portion 62, the rotation of the second hinge shaft 2 is restrained in a direction of arrow G and the second casing R is positioned at the closed position.

Figure 13A:
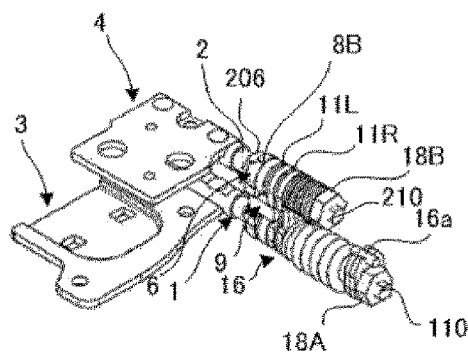
FIGS. 13A to 13E show an opening and closing device as shown in FIG. 3 at a hinge angle of 0 degree, FIG. 13A being a perspective view of appearance, FIG. 13B—a top view, FIG. 13C—a right hand side view, FIG. 13D—a sectional view of a hinge shaft switching mechanism being a sectional view in line A-A in FIG. 13B, and FIG. 13E—a sectional view of a stopper mechanism being a sectional view in line B-B in FIG. 13B.
Figure 13B:
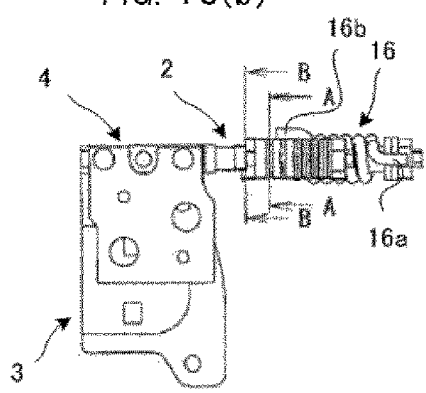
Figure 13C:
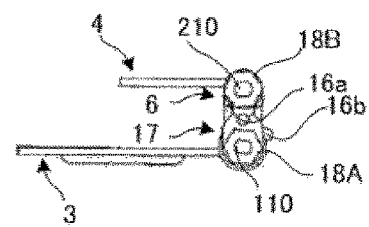
Figure 13D:
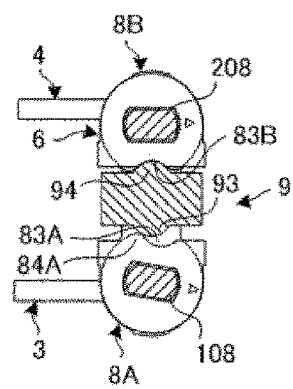

As shown in FIG. 13D, as per the hinge shaft switching mechanism T, since the second locking projection 94 of the locking piece 9 is fitted into the second locking concave groove 83B of the second locking cam 8B, and the first locking projection 93 of the locking piece 9 abuts against the left continuously provided surface 84A of the first locking cam 8A, the locking piece 9 locks the second locking cam 8B and thus the second hinge shaft 2 is non-rotatable relative to the stopper plate 6. In other words, the locking piece 9 is in unlocked state from the first locking cam 8A. More specifically, the first locking projection 93 of the locking piece 9 abuts against the left continuously provided surface 84A of the first locking cam 8A over the first locking concave groove 83A. In this manner, the stopper plate 6 is here rotatable relative to the first hinge shaft 1.

Figure 13E:
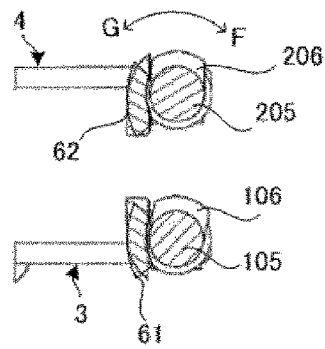

As shown in FIG. 13E, the stopper plate 6 can rotate α degrees in the opening direction as denoted with the arrow F, until the first stopper blocking portion 61 abuts against the first stopper projecting piece 106. Here, the rotational force for rotating the stopper plate 6 in the opening direction is larger than the spring force (torsion torque) for elastically deforming the torsion spring 16 and the friction force of the first free stop tilting mechanism U.

However, the spring force for elastically deforming the torsion spring 16 increases proportional to the rotation angle of the stopper plate 6, so no large reaction force is suddenly applied.

Figure 14A:
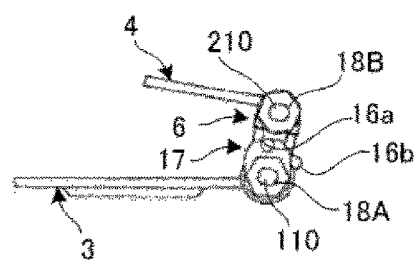
FIGS. 14A to 14C show an opening and closing device as shown in FIG. 3 at a hinge angle of 10 degrees, FIG. 14A being a right hand side view, FIG. 14B—a sectional view of a hinge shaft switching mechanism, and FIG. 13C—a sectional view of a stopper mechanism.

When the second casing R rotates in an opening direction from the closed position shown in FIG. 13, the stopper plate 6 rotates α degrees (10 degrees according to the present embodiment) and then stops. When, as shown in FIG. 14A, the second casing R starts to rotate in an opening direction from the closed position, the opening torque applied to the second casing R is the sum of the torsion torque of the torsion spring 16 and the friction torque of the first free stop tilting mechanism U.

If the disc spring is used instead of the torsion spring 16 to rotate the stopper plate 6 around the X1 axis of the first hinge shaft 1, the cam mechanism must be used to convert the spring force of the disc spring into the rotation force and to lock the stopper plate 6 at any opened angle position. In such a cam mechanism, the cam follower is formed to ride over the cam top of the cam, wherein the position in which the cam follower rides over the cam top is referred to as the locking position.

However, when the cam follower rides over the cam top, the opening torque of the second casing R suddenly increases, so that the second casing R does not rotate around the X1, and the second casing R does rotate integrally with the first casing Q.

Figure 14B:
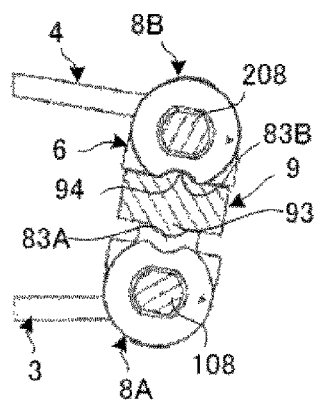

On the other hand, in the present embodiment, when the stopper plate 6 is about to lock the first hinge shaft 1, as shown in FIG. 14B, at the opening limit position of the stopper plate 6, the first locking projection 93 of the locking piece 9 gets fitted into the first locking concave groove 83A of the first locking cam 8A due to its own weight, so that the stopper plate 6 is held at the locking position. Therefore, as state above, the opening torque of the second casing R is merely the sum of the torsion torque of the torsion spring 16 and the friction torque of the first free stop tilting mechanism U, and not subject to torque fluctuations. In this manner, when the second casing R is opened from the closed position, it can be smoothly opened.

When the hinge angle in the state as shown in FIG. 13 is referred to as a hinge angle of 0 degree and that in the state as shown in FIG. 14 is as a hinge angle of 10 degrees, then the locking piece 9 locks the second locking cam 8B, and unlocks the first locking cam 8A between these angles. Therefore, when the opening torque is applied to the second casing R such that the latter is opened, the second casing R rotates integrally with the stopper plate 6 around the X1 axis, due to the predetermined opening torque generated on the first free stop tilting mechanism U.

Figure 14C:
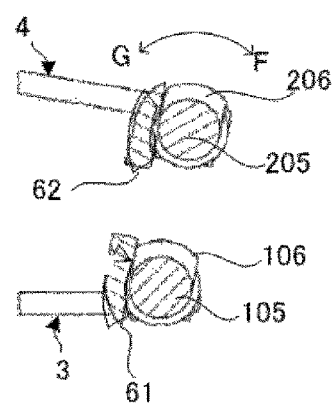

When, as shown in FIG. 14C, the first stopper blocking portion 61 of the stopper plate 6 rotates in a direction denoted with the arrow F up to the limit opened position of α degrees, at which it abuts against the first stopper projecting piece 106, the first locking concave groove 83A of the first locking cam 8A faces the first locking projection 93 of the locking piece 9 in the upward and downward direction. In this case, the locking piece 9 falls downward due to its own weight, so that the second locking projection 94 of the locking piece 9 is released from an engagement with the second locking concave groove 83B of the second cam plate 8B and engages with the first locking projection 93 of the first cam plate 8A. Accordingly, the rotation of the stopper plate 6 is restrained, while the second hinge shaft 2 is rotatable relative to the stopper plate 6, around the X2 axis.

Figure 15A:
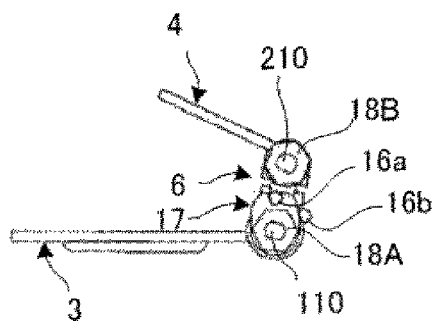
FIGS. 15A to 15C show an opening and closing device as shown in FIG. 3 at a hinge angle of 25 degrees, FIG. 15A being a right hand side view, FIG. 15B—a sectional view of a hinge shaft switching mechanism, and FIG. 15C—a sectional view of a stopper mechanism.
Figure 15B:
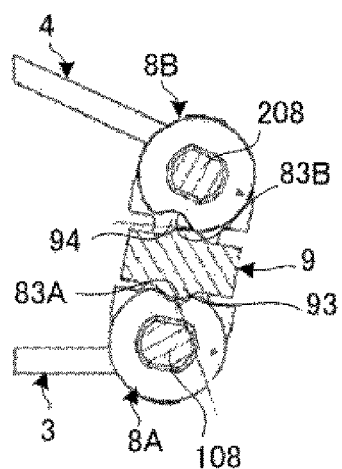
Figure 15C:
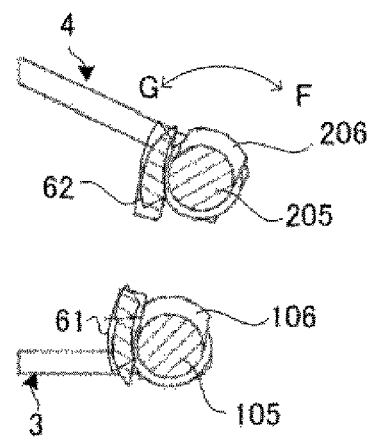

FIG. 15 show a state of the second casing R having rotated up to a hinge angle of 25 degrees from the initial opening position of the second casing R shown in FIG. 14.

In FIG. 15B, the second left continuously provided surface 84B of the second locking cam 8B abuts against the second locking projection 94 of the locking piece 9, and this prevents the first locking projection 93 of the locking piece 9 from escaping from the first locking concave groove 83A of the first locking cam 8A. Thus, the stopper plate 6 is securely locked to the first hinge shaft 1.

Figure 16A:
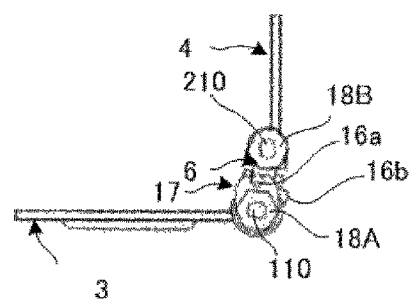
FIGS. 16A to 16C show an opening and closing device as shown in FIG. 3 at a hinge angle of 90 degrees, FIG. 16A being a right hand side view, FIG. 16B—a sectional view of a hinge shaft switching mechanism, and FIG. 16C—a sectional view of a stopper mechanism.
Figure 16B:
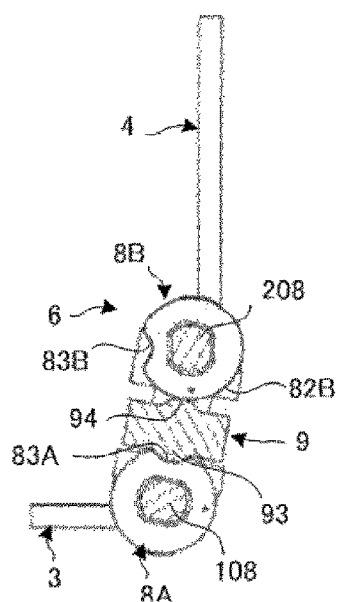
Figure 16C:
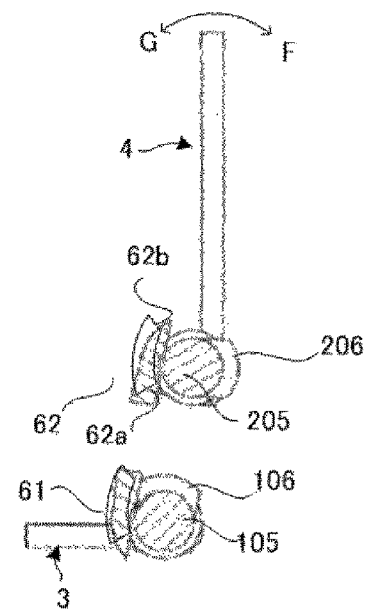

FIG. 16 show a state of the second casing R having further rotated up to a hinge angle of 90 degrees.

As shown In FIG. 16B, the second arc-shaped surface 82B of the second locking cam 8B abuts against the second locking projection 94 of the locking piece 9. Thus, the second hinge shaft 2 is rotatable, but can be arrested at any tilting angle by the second free stop tilting mechanism V.

In the present embodiment, it can move within the hinge angle range of 10 to 190 degrees. In the meantime, the opening angle for practical use is set e.g. from 135 to 190 degrees.

Figure 17A:
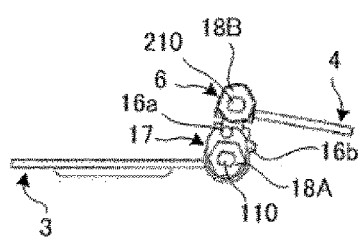
FIGS. 17A to 17C show an opening and closing device as shown in FIG. 3 at a hinge angle of 190 degrees, FIG. 17A being a right hand side view, FIG. 17B—a sectional view of a hinge shaft switching mechanism, and FIG. 17C—a sectional view of a stopper mechanism.
Figure 17B:
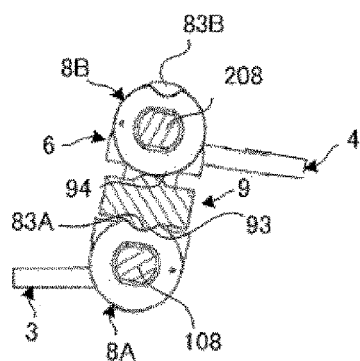
Figure 17C:
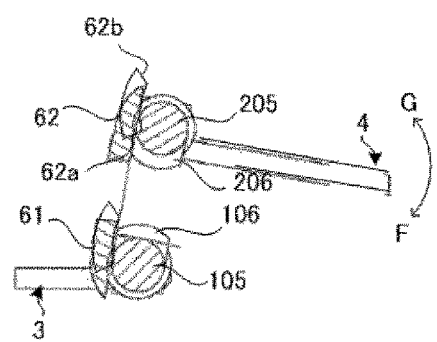

FIG. 17 shows a state at a hinge angle of 190 degrees. As shown In FIG. 17B, the first locking cam 8A is maintained in the fixed state, while the second locking cam 8B—in unlocked state. On the other hand, as shown in FIG. 17C, the second stopper projecting piece 206 provided on the second hinge shaft 2 abuts against one tip 62a of the second stopper blocking portion 62, thus restraining the rotation of the second hinge shaft 2 in the opening direction. From the tilting angle of 90 degrees as shown in FIG. 16 to the tilting angle of 190 degrees as shown in FIG. 17, the second hinge shaft 2 is rotatable, but can be arrested at any tilting angle by the second free stop tilting mechanism V.

In the embodiment as described in the foregoing, the first free stop tilting mechanism U is so formed that it can generate the friction torque and stop the second casing R at any tilting angle from the closed position to the initial opened position, but it is also possible that no friction torque generating function is secured for the first free stop tilting mechanism, but merely the torsion spring 16 applies the spring torque in the closing direction to the second casing R.

Still further, the torsion spring 16 is used as closing spring, but the spring used is not limited to the torsion spring, and the spring structure which can apply a spring force in the closing direction.

Still further, reference is made to the notebook PC being an example of terminal device in the embodiment as described in the foregoing, but the present invention is also applicable to other terminal devices, such as mobile PC, electronic dictionary, and PDA etc.

What is claimed is:

1. An opening and closing device for coupling a first casing and a second casing, said second casing thereby being opened within a range of a predetermined opening angle starting from a closed position relative to said first casing, said opening and closing device comprising:
   a first hinge shaft attached to said first casing;
   a second hinge shaft attached to said second casing;
   a coupling member for pivotally supporting the first hinge shaft and the second hinge shaft so as to rotate relative to each other, the first hinge shaft lying in a certain interval from the second hinge shaft, the coupling member being disposed to couple said first hinge shaft and said second hinge shaft in parallel;
   a rotation restraining portion for restraining a rotation range of rotation of said coupling member and said first hinge shaft relative to each other between said closed position and an initial opened position;
   a hinge shaft switching mechanism disposed to restrain a rotation of said second hinge shaft relative to said coupling member, up to said initial opened position of said coupling member as a result of its rotation relative to said coupling member, and disposed to said first hinge shaft in order to restrain a rotation of said first hinge shaft relative to said coupling member thereby allowing for a rotation of said first hinge shaft relative to said coupling member, while a rotation position of said coupling member is in said initial opened position;
   a closing spring for applying a spring force in a closing direction to said coupling member; and
   a free stop tilting mechanism provided at least on said second hinge shaft for stopping by a friction torque said second casing attached to said second hinge shaft at any tilting angle.

2. The opening and closing device according to claim 1, said hinge shaft switching mechanism comprising: a first locking cam fixed on said first hinge shaft, a first locking concave groove being formed on outer circumferential portion of said first locking cam; a second locking cam fixed on said second hinge shaft, a second locking concave groove being formed on outer circumferential portion of said second locking cam; and a locking piece for selectively moving between said first locking cam and said second locking cam, said locking piece thereby engaging with one of said first locking concave groove and said second locking concave groove, and disengaging with the other locking concave groove, said first locking concave groove and said second locking concave groove sandwiching said piece and facing each other, while said coupling member rotating in order to reach said initial opened position.

3. The opening and closing device according to claim 2, said closing spring being a torsion spring being inserted from the outside of said first hinge shaft.

4. The opening and closing device according to claim 2, said rotation restraining portion comprising: a first stopper projecting piece provided on said first hinge shaft and a stopper blocking portion provided on said coupling member so as to abut against said first stopper projecting piece.

5. A terminal device comprising the opening and closing device according to claim 2,
said first casing being attached to said first hinge shaft via a first bracket connected with said first hinge shaft, and said second casing being attached to said second hinge shaft via a second bracket connected with said second hinge shaft.

6. The opening and closing device according to claim 1, said closing spring being a torsion spring being inserted from the outside of said first hinge shaft.

7. A terminal device comprising the opening and closing device according to claim 6,
said first casing being attached to said first hinge shaft via a first bracket connected with said first hinge shaft, and said second casing being attached to said second hinge shaft via a second bracket connected with said second hinge shaft.

8. The opening and closing device according to claim 1, said rotation restraining portion comprising: a first stopper projecting piece provided on said first hinge shaft and a stopper blocking portion provided on said coupling member so as to abut against said first stopper projecting piece.

9. A terminal device comprising the opening and closing device according to claim 8,
said first casing being attached to said first hinge shaft via a first bracket connected with said first hinge shaft, and said second casing being attached to said second hinge shaft via a second bracket connected with said second hinge shaft.

10. A terminal device comprising the opening and closing device according to claim 1,
said first casing being attached to said first hinge shaft via a first bracket connected with said first hinge shaft, and said second casing being attached to said second hinge shaft via a second bracket connected with said second hinge shaft.

\* \* \* \* \*